United States Patent [19]

Diederen et al.

[11] Patent Number: 4,634,329
[45] Date of Patent: Jan. 6, 1987

[54] LOADING DEVICE FOR A HORIZONTAL CONTINUOUS FURNACE FOR THE HEATING OF GLASS PLATES

[75] Inventors: Werner Diederen, Herzogenrath; Herbery Sonnleitner, Stolberg, both of Fed. Rep. of Germany

[73] Assignee: Saint-Gobain Vitrage, Courbevoie, France

[21] Appl. No.: 671,204

[22] Filed: Nov. 14, 1984

[30] Foreign Application Priority Data

Nov. 14, 1983 [DE] Fed. Rep. of Germany ....... 3341207

[51] Int. Cl.⁴ ............................................. C03B 35/16
[52] U.S. Cl. ..................................... 414/159; 65/106; 65/111; 198/451; 198/468.8; 414/172; 432/122
[58] Field of Search ............... 414/150, 152, 159, 147, 414/160, 172; 198/488, 451, 460, 492, 463.6, 468.8; 65/106, 107, 111, 323, 254; 432/122, 124

[56] References Cited

U.S. PATENT DOCUMENTS

| | | | |
|---|---|---|---|
| 2,038,662 | 4/1936 | Laverdisse | 65/254 |
| 3,249,415 | 5/1966 | McMaster et al. | 414/159 X |
| 3,251,452 | 5/1966 | Conway et al. | 198/460 |
| 3,254,778 | 6/1966 | Marland et al. | 414/159 |
| 3,565,236 | 2/1971 | Southworth et al. | 198/460 |
| 4,120,393 | 10/1978 | Motooka et al. | 198/492 X |
| 4,282,026 | 8/1981 | McMaster | 65/107 X |
| 4,364,766 | 12/1982 | Nitschke | 198/460 X |
| 4,488,846 | 12/1984 | Halberschmidt et al. | 414/159 |

FOREIGN PATENT DOCUMENTS

| | | | |
|---|---|---|---|
| 2500786 | 7/1975 | Fed. Rep. of Germany | 198/492 |
| 3341207 | 6/1985 | Fed. Rep. of Germany | |
| 2112728 | 7/1983 | United Kingdom | 198/460 |

Primary Examiner—Joseph E. Valenza
Assistant Examiner—David A. Bucci
Attorney, Agent, or Firm—Oblon, Fisher, Spivak, McClelland & Maier

[57] ABSTRACT

A loading device for a horizontal continuous furnace for the heating of glass plates comprises a roller conveyer (6) as part of a continuous conveying system. Support strips (12–15, 32–35) can be lowered and are arranged between conveying rollers (7) of the roller conveyer at a feed station (A). The glass plates (2, 3, 4, 5) are placed on the raised support strips (12–15, 32–35) and are lowered onto the conveying rollers at a preset time by simultaneous lowering of all support strips. Each support strip (12–15, 32–35) is supported independently of the other support strips on separate lifting devices (16–19, 36–39). These lifting devices (16–19, 36–39) are controlled by reflecting photoelectric barriers (22–25, 42–45) respectively dedicated to each support strip such that each support strip (12–15, 32–35) is individually raised to an upper position as soon as a glass plate transferred to the conveying rollers (7) has left the area of that support strip. Glass plates (4, 5) coming from another feed station (B), located upstream, pass below the raised support strips (14, 15) while, simultaneously, the next glass plates can be placed on these same support strips (14, 15).

7 Claims, 1 Drawing Figure

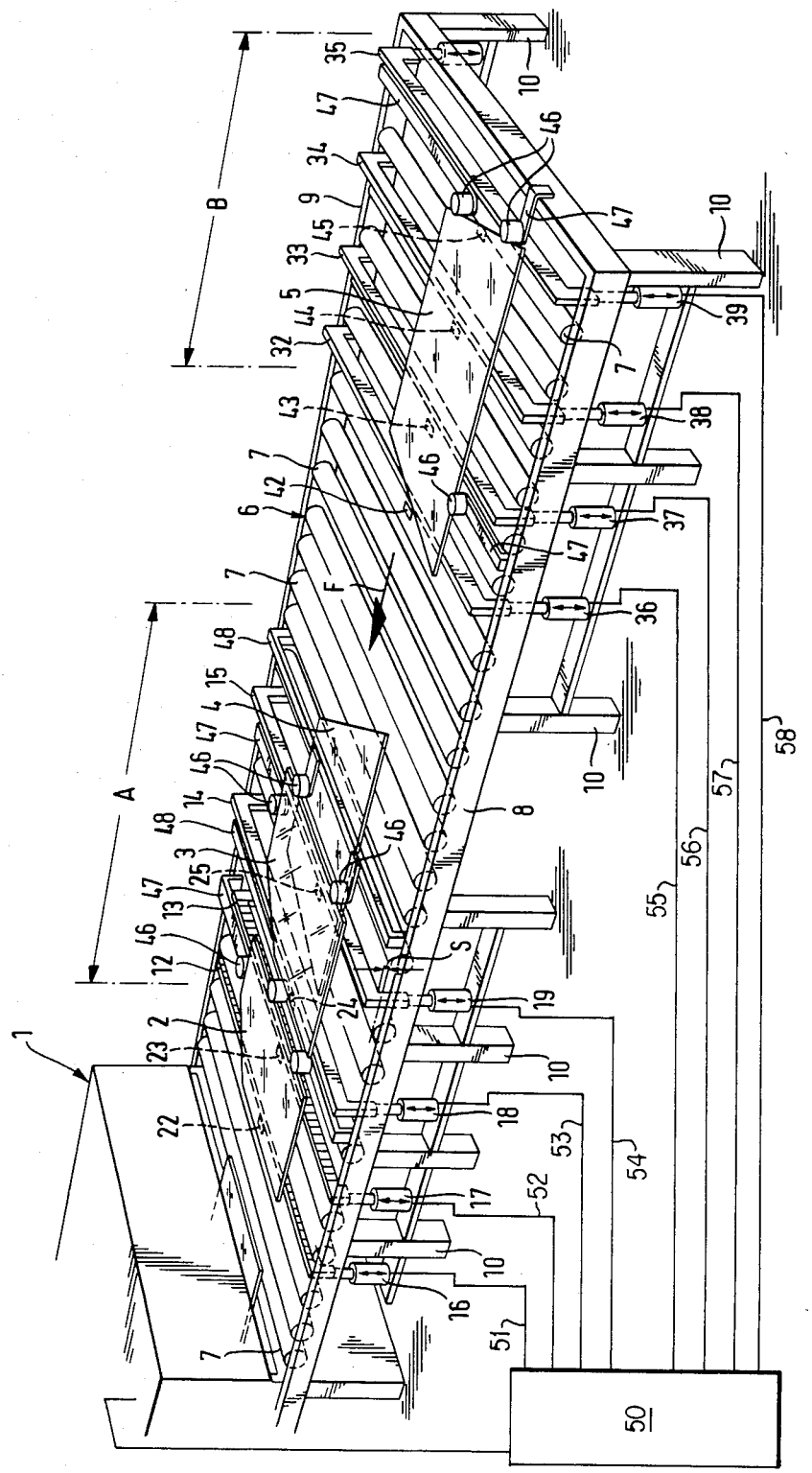

LOADING DEVICE FOR A HORIZONTAL CONTINUOUS FURNACE FOR THE HEATING OF GLASS PLATES

BACKGROUND OF THE INVENTION

1. Field of the Invention

The invention relates to a loading device for a horizontal continuous furnace for heating glass plates to bending or tempering temperature, comprising a roller conveyer with at least one feed station superposed on the conveying system of the continuous furnace. Support strips are arranged between the conveying rollers. The support strips can be lowered below the conveying surface onto which the glass plates are placed. They can be positioned in a raised condition and, at a proper time, simultaneously lowered for transfer of the glass plates to the roller conveyer.

2. Discussion of the Background

In known loading devices of this kind, the support strips that can be lowered are arranged on a common frame. After placing the glass plate or glass plates on the support strips, which can be done manually or mechanically, the entire frame with the support strips is lowered with the help of a lifting device and the glass plates are transferred to the conveying rollers by which they are transported into the furnace. As soon as the area of the roller conveyer above the support strips has become empty, the frame with the support strips is raised by the lifting device and the next glass plate or the next glass plates can be placed on the support strips and positioned on these support strips.

Exact positioning of the glass plates on the support strips as well as lowering the support strips at the specified times is important for the present automatic continuous furnaces to guarantee, on the one hand, a specific final temperature of the glass plates within narrow tolerance limits and to ensure, on the other hand, that the glass plates occupy a predetermined position in the processing station after the continuous furnace, which can involve, e.g., a bending station. In the case of continuous furnaces with high throughput, the station time with which the glass plates follow right behind one another in close proximity can become relatively short, so that the time available after raising of the support strips for placing and aligning the next glass plate or glass plates becomes extremely short and is insufficient, e.g., for careful aligning of the glass plates.

SUMMARY OF THE INVENTION

The invention aims at developing a loading device of the mentioned type, so that the available period for placing and aligning the glass plate on the support strips is extended without extending the cycle time of the furnace.

According to the invention, this aim is achieved by the fact that at least one of the support strips of the feed station is mounted independently of the other support strips, is equipped with its own lifting device and can be raised again ahead of the other support strips, as soon as it is free of the glass plate taken over by the conveying rollers.

Thus while in the state of the art the support strips are available for placing the next glass plate only when the glass plate transferred to the conveying rollers has also left the area above the last support strip, according to the invention one or more rear support strips, viewed in the direction of conveyance, are already raised ahead of the last support strip. Thus at least part of the supporting surface formed by the support strips is available earlier for placing the next glass plate on it.

In its simplest embodiment, a feed station may comprise two support strips whose lifting movement is controlled one independently of the other. This design already has the advantage that the next glass plate can be at least partially supported on this support strip that is raised earlier. If in addition the raised support strip is raised so much that the conveyance of glass plates below the raised support strip is made possible, the next glass plate, which was placed on a second feed station, if necessary can pass into the area of this feed station even though the last part of this feed station has not yet been released.

In an advantageous further development of the invention, every support strip is individually supported independent of the neighboring support strip and provided with a lifting device of its own. Furthermore, a detector device is assigned to each support strip which, viewed in the direction of the conveyance, is arranged behind the support strip belonging to it and controls the lifting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The drawing shows a loading device according to the invention with two feed stations joined in tandem.

DESCRIPTION OF THE PREFERRED EMBODIMENT

The loading device for the continuous furnace 1 for heating of glass plates 2, 3, 4, 5 to bending or tempering temperature comprises the roller conveyer 6, which in turn comprises a series of driven cylindrical conveying rollers 7, which are supported in the longitudinal beams 8, 9. The conveying rollers 7 within the loading device turn at the same circumferential speed as the conveying rollers within the continuous furnace 1. The longitudinal beams 8, 9 are supported on supports 10.

Two feed stations A, B are provided in tandem on the roller conveyer 6; within the feed stations, the glass plates are placed on the roller conveyer 6 manually or with the help of a suitable device.

Within a feed station A, a total of four support strips 12, 13, 14 and 15 are individually supported, adjustable in vertical direction, between two conveying rollers 7 each. The purpose of the lifting devices 16, 17, 18 and 19, desinged as pneumatic cylinders, on which each support strip is supported on both its ends, is to perform the raising and lowering movement of the support strips 12 to 15. Each support strip comprises an upper surface, on which a glass plate may rest when the support strip is in the raised position, and a lower surface. In the position shown in the drawing, the two front support strips 12 and 13 are in their lowered positions in which the upper surface of the support strips are disposed below the conveying surface of the conveying rollers 7. In the raised position, in which the support strips 14 and 15 are shown, the support strips are raised so much that a gap 5 is formed between the lower surfaces of the support strips and the conveying level formed by the conveying rollers 7. The gap S is sufficient for the glass plates 4, 5 to pass below the raised support strips.

Looking in the conveying direction of the glass plates (arrow F), a detector in each case comprising a reflecting photoelectric barrier 22, 23, 24, 25 behind each support strip 12, 13, 14, 15 is placed below the conveying surface. These reflecting photoelectric barriers control respective lifting devices 16 to 19 of the support strips 12 to 15 such that, at the moment when the rear edge of a glass plate moving on the roller conveyer passes a photoelectric barrier, the latter emits a signal that leads to the raising of the support strip to which the photoelectric barrier is dedicated.

The feed station B is set up in a similar manner. It also comprises four bridge-like support strips 32, 33, 34 and 35, which are supported at their ends and are movable by means of pneumatic lifting cylinders 36, 37, 38 and 39 to a raised or lowered position. A detector device in turn is assigned to each individual support strip, which, in each case comprises a reflecting photoelectric barrier 42, 43, 44 and 45 and, viewed in the conveying direction, in each case is arranged directly behind the support strip belonging to it.

Within the feed stations A and B, there are in addition in each case some adjusting elements 46 on brackets 47, which on their part are attached to the frame of the roller conveyer directly or by bridge-like crossbeams 48. The adjusting elements are movable, so that their position can be set depending upon shape and size of the glass plates. As a rule, three such adjusting elements 46 are sufficient to fix the glass plates precisely in the desired position.

By means of the position of the support strips and the glass plates shown in the drawing, the mode of operation of the loading device and the sequence of the individual steps are described once again as follows:

All conveying rollers 7 of the roller conveyer rotates continuously and take over the glass plates at the moment when they are lowered from the support strips to the conveying rollers. While the support strips 12 and 13 are lowered, glass plate 2 is on the conveying rollers 7 approximately in the area above these support strips 12 and 13. Prior to that, glass plate 2 had been placed on support strips 14 and 15 and positioned by placing it against three adjusting elements 46 and, by simultaneous lowering of all four support strips 12, 13, 14 and 15, it was passed on to the conveying rollers. After the rear edge of the glass plate 2 has passed the reflecting photoelectric barrier 25, the lifting device 19 was thus activated, and the support strip 15 was brought to its upper position. Support strip 14 was also raised at the moment when the rear edge of the glass plate 2 had passed the reflecting photoelectric barrier 24. Immediately thereafter, support strip 14 had also been raised to the upper position, glass plate 3 was placed on the support strips 14, 15 and positioned by pushing against the three adjusting elements 46.

While glass plate 3 is placed on support strips 14, 15, glass plate 4 at the same time already passes below these support strips. Glass plate 4 is a glass plate which, just as glass plate 5, was placed on the support strips 32, 33, 34, 35 in feed station B. Glass plate 5, as the next glass plate, is placed on conveying rollers 7 by simultaneous lowering of support strips 32 to 34.

When glass plate 4 approaches support strip 13, glass plate 2 will already have passed the reflecting photoelectric barrier 23, whereby support strip 13 will have been brought to the raised position. Subsequently, support strip 12 will also be raised. Thus the two support strips 12, 13 will be in the upper position, so that the next glass plate can be placed on these support strips 12, 13, while glass plate 4 simultaneously will pass below these raised support strips.

The control commands for simultaneous lowering of all four support strips within each feed station will be given by a central command unit 50 in a known manner. The independent control over each support strip 12–15, 32–35 set forth above is symbolized by separate control lines 51–58 respectively connected between central command unit 50 and the lifting cylinders 16–19, 36–39.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A loading device for a horizontal continuous furnace for the heating of glass plates to bending or tempering temperature, said loading device comprising a continuous conveying system having at least one feed station at which the glass plates are lowered onto said conveying system, said continuous conveying system comprising:
    a roller conveyor for transporting the glass sheets from said at least one feed station toward the furnace, said roller conveyor defining a conveying level;
    a plurality of support strips having upper surfaces and being respectively disposed between adjacent rollers of said roller conveyor at said at least one feed station, said upper surfaces of said support strips comprising means for restingly receiving a glass plate being lowered onto said conveying system;
    means for transferring a glass plate resting on said upper surfaces of said support strips directly onto said roller conveyor, including support strip lifting means for raising and lowering said support strips being lowered positions in which said upper surfaces thereof are below said conveying level and raised positions in which said upper surfaces thereof are above said conveying level, wherein a glass plate is transferred to said roller conveyor by simultaneous lowering of said support strips, said support strip lifting means comprising independent moving means for raising at least one of said support strips independently of the remainder of said support strips;
    detection means disposed adjacent said at least one support strip, on the furnace side thereof, and being responsive to the presence of a glass plate immediately downstream from said at least one support strip, said independent moving means being responsive to said detection means, wherein said at least one support strip is raised to said raised position thereof in response to the passage of a glass plate along said roller conveyor away from said detection means; and
    control means for operating said support strip lifting means.

2. A loading device as claimed in claim 1, wherein said support strip lifting means comprises separate and independent lifting means for raising every support strip independently of every other support strip.

3. A loading device as claimed in claim 1, wherein said detection means comprises reflecting photoelectric barriers.

4. A loading device as claimed in claim 1, further comprising adjusting means for establishing proper positioning of the glass plates in said at least one feed station.

5. A loading device as claimed in claim 1, wherein said control means comprises a central command unit for controlling the lowering movement of said support strip lifting means.

6. A loading device as claimed in any one of claims 1-5, said conveying system comprising at least one additional feed station joined in tandem with said at least one feed station in the conveying direction of the glass plates.

7. A loading device as claimed in claim 6, wherein each said support strip has a bridge-like shape configured such that a glass plate may pass thereunder when said support strip is in said raised position.

* * * * *